US010536271B1

United States Patent
Mensch et al.

(10) Patent No.: US 10,536,271 B1
(45) Date of Patent: Jan. 14, 2020

(54) SILICON KEY ATTESTATION

(71) Applicant: Apple Inc., Cupertino, CA (US)

(72) Inventors: Thomas P. Mensch, Sunnyvale, CA (US); Conrad Sauerwald, Mountain View, CA (US); Jerrold V. Hauck, Windermere, FL (US); Timothy R. Paaske, San Jose, CA (US); Zhimin Chen, San Jose, CA (US); Andrew R. Whalley, San Francisco, CA (US)

(73) Assignee: Apple Inc., Cupertino, CA (US)

(*) Notice: Subject to any disclaimer, the term of this patent is extended or adjusted under 35 U.S.C. 154(b) by 110 days.

(21) Appl. No.: 15/435,229

(22) Filed: Feb. 16, 2017

Related U.S. Application Data

(63) Continuation of application No. 15/274,232, filed on Sep. 23, 2016, now abandoned.
(Continued)

(51) Int. Cl.
*H04L 9/08* (2006.01)
*H04L 9/14* (2006.01)
(Continued)

(52) U.S. Cl.
CPC .......... *H04L 9/0866* (2013.01); *H04L 9/0869* (2013.01); *H04L 9/14* (2013.01);
(Continued)

(58) Field of Classification Search
CPC ....... H04L 9/0861; H04L 9/0869; H04L 9/14; H04L 9/30; H04L 9/0897; H04L 9/08;
(Continued)

(56) References Cited

U.S. PATENT DOCUMENTS 6,996,710 B1 * 2/2006 Ellison .................. H04L 9/0861
713/156
7,711,960 B2 * 5/2010 Scarlata ................ H04L 9/0897
713/155
(Continued)

OTHER PUBLICATIONS

Innovative Technology for CPU Based Attestation and Sealing (Intel Corporation) Ittai Anati, Shay Gueron, Simon P Johnson, Vincent R Scarlata pp. 7 (Year: 2013).*
(Continued)

*Primary Examiner* — Jeffrey C Pwu
*Assistant Examiner* — Ali H. Cheema
(74) *Attorney, Agent, or Firm* — Kowert, Hood, Munyon, Rankin & Goetzel, P.C.

(57) ABSTRACT

Systems and methods are disclosed for generating one or more hardware reference keys (HRK) on a computing device, and for attesting to the validity of the hardware reference keys. An initial hardware reference key can be a silicon attestation key (SIK) generated during manufacture of a computing system, such as a system-on-a-chip. The SIK can comprise an asymmetric key pair based at least in part on an identifier of the processing system type and a unique identifier of the processing system. The SIK can be signed by the computing system and stored thereon. The SIK can be used to generate further HRKs on the computing device that can attest to the processing system type of the computing device and an operating system version that was running when the HRK was generated. The computing device can generate an HRK attestation (HRKA) for each HRK generated on the computing system.

19 Claims, 16 Drawing Sheets

Related U.S. Application Data

(60) Provisional application No. 62/276,913, filed on Jan. 10, 2016.

(51) Int. Cl.
*H04L 9/30* (2006.01)
*H04L 9/32* (2006.01)
*G06F 21/70* (2013.01)
*G06F 21/73* (2013.01)
*G06F 21/57* (2013.01)

(52) U.S. Cl.
CPC .............. *H04L 9/30* (2013.01); *H04L 9/3263* (2013.01); *G06F 21/575* (2013.01); *G06F 21/70* (2013.01); *G06F 21/73* (2013.01); *H04L 9/08* (2013.01); *H04L 9/32* (2013.01)

(58) Field of Classification Search
CPC ....... H04L 9/3263; H04L 9/32; G06F 9/4406; G06F 21/73; G06F 21/575; G06F 21/70
USPC ...... 713/159, 171, 2, 155, 156; 380/278, 44; 726/4, 34
See application file for complete search history.

(56) References Cited

U.S. PATENT DOCUMENTS

| | | | |
|---|---|---|---|
| 9,448,950 B2 | 9/2016 | Scarlata et al. | |
| 2006/0036851 A1* | 2/2006 | DeTreville | G06F 9/4406 713/159 |
| 2009/0323967 A1* | 12/2009 | Peirce | H04L 9/0869 380/278 |
| 2012/0254949 A1* | 10/2012 | Mikkonen | G06F 21/73 726/4 |
| 2014/0068238 A1* | 3/2014 | Jaber | G06F 21/575 713/2 |
| 2014/0189890 A1* | 7/2014 | Koeberl | G06F 21/70 726/34 |
| 2014/0298027 A1* | 10/2014 | Roberts | H04L 9/0869 713/171 |
| 2016/0006754 A1 | 1/2016 | Woodward et al. | |
| 2016/0134621 A1 | 5/2016 | Palanigounder | |
| 2016/0352516 A1* | 12/2016 | Oberheide | H04L 9/0861 |

OTHER PUBLICATIONS

Trusted Computing Group, "Trusted Platform Module Library", Part 1, Architecture. Family "2.0", Levell 00, revision 01.16, Oct. 30, 2014, pp. 269.

"Web Authentication: An API for accessing Public Key Credentials Level 1," Editor's Draft, 119 pages, Oct. 16, 2017.

* cited by examiner

400

| | Register | Description |
|---|---|---|
| 405→ | GID | Global identifier for SOC type |
| 410→ | UID | Unique identifier of this SOC |
| 415→ | SIK digest | Digest of Silicon HRK (temp. storage during generation of attestation) |
| 425→ | OS version | Current version of SEP OS |
| 430→ | Key space | |
| 435→ | $HRK_i$ public key | Public portion of $HRK_i$ |
| 440→ | $HRK_i$ digest | Digest of $HRK_i$ (temp. storage during generation of attestation) |
| | ... | |

| | 48 byte Seed | Description of Seed Portions | |
|---|---|---|---|
| 450→ | 48 byte Seed | Description of Seed Portions | |
| 455→ | 4 bytes | SEP application that uses the seed (user generated key, TouchID, etc) | |
| 457→ | 4 bytes | Reserved: Key usage | |
| 460→ | | Bit | Bit usage |
| 461→ | | 0 | Reserved |
| 462→ | | 1 | Attestation bit flag |
| 463→ | | 2 | Use complete seed flag |
| 464→ | | 3 | Use OS version flag |
| 465→ | | 4 | Use EC_ID and CHIP_ID in digest |
| 466→ | | 5 | USE GID |
| 467→ | | 6-31 | Reserved |
| 470→ | 40 bytes | Randomly generated by SEP OS, OS version added by PKA module | |

*FIG. 4*

SILICON KEY ATTESTATION

RELATED APPLICATIONS

This United States Patent application is a continuation of co-pending U.S. patent application Ser. No. 15/274,232, filed Sep. 23, 2016, and entitled "SILICON KEY ATTESTATION," which in turn claims priority under 35 U.S.C. § 119(e) of U.S. Provisional Patent Application No. 62/276, 913, filed Jan. 10, 2016, and entitled "SILICON KEY ATTESTATION," both of which are incorporated herein by reference to the extent that they are consistent with this disclosure.

TECHNICAL FIELD

This disclosure relates to the field of secure operation of an electronic device using cryptographic functions.

BACKGROUND

Electronic commerce (e-commerce), such as purchase transactions and banking, and electronic communications, can be performed using an electronic device such as a desktop computer, a tablet computer, e.g. an iPad®, or a smart phone, e.g. an iPhone®. To securely perform these functions, a computing device can use cryptographic keys and authentication credentials to verify the identity of the user and establish a secure communication or transaction channel. A computing device can further verify identity of a user and/or identity of a computing device of the user by correlating one or more cryptographic keys, user authentication credentials, and attributes of a particular computing device of the user, such as an operating system version, computing device unique identifier, or other information.

One way to identify a computing device is to use a hardware reference key (HRK). A hardware reference key can be an asymmetric key pair, having a public key portion, that can be used to identify a particular computing device, a class of computing device using a particular processor configuration, and/or an operating system version used by the computing device. An e-commerce service can store both the hardware reference key and the user authentication credentials, such as a username and a passcode. A service can, for example, store the public key portion of the hardware reference key for the computing device along with the user authentication credentials. When a user attempts to access the service at a later time, the service may allow the computing device to access the services provided using the hardware reference key in lieu of requiring re-entry of user authentication credentials.

Computing devices in the prior art are not able to attest to the validity of their own hardware reference keys.

SUMMARY OF THE DESCRIPTION

Embodiments are described for a computing device generating one or more hardware reference keys for itself. The computing device can further generate one or more hardware reference key attestations that attest to the authenticity of the hardware reference keys generated. In an embodiment, a hardware reference key can be a symmetric key pair, having a private key and a public key portion. The hardware reference key attestation can identify the current version of an operating system running within the computing device. In an embodiment, the identified operating system can comprise an operating system version for a secure enclave processor. In an embodiment, the secure enclave processor can comprise a secure portion of a system on a chip.

In a first embodiment, a system for performing secure operations over a network can include a computing device that comprises a key generation module that can generate one or more hardware reference keys (HRK). The computing device can further include a public key accelerator (PKA) module that can publish the public portion of an HRK and can further publish an attestation (HRKA) that attests to the validity of an HRK. The HRKA can attest to the processing system classification (e.g. a processor type such as the Apple® A9) that was running on the computing device at the time that the HRK was generated. The HRKA can further attest to the version of an operating system (e.g., secure enclave processor operating system, SEP OS) that was running on the computing device at the time that the HRK was generated. The HRKA can be sent to a manufacturer's privacy certificate authority or a third party privacy certificate authority ("privacy CA"). A privacy CA can have stored thereon sufficient information to verify that an HRKA attesting to an HRK was in fact generated by the computing device that generated the HRK. Privacy CA can then generate an X509 certificate and return the certificate to the computing device for use in accessing a service.

In another embodiment, a system for performing secure operations over a network can further include a manufacturer's privacy certificate authority and/or a third party privacy certificate authority that can store one or more hardware reference keys of a computing device and can certify one or more of: a processor class of the computing device, an operating system of the computing device that was running when the HRK was generated, or the application that requested that the HRK be generated on behalf of a requesting service.

In another embodiment a non-transitory computer readable can store executable instructions, that when executed by a processing system, can perform any of the method functionality described above.

In yet another embodiment, a processing system comprising at least one hardware processor, coupled to a memory programmed with executable instructions can, when the instructions are executed by the processing system, perform any of the method operations described above.

Some embodiments described herein can include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

A hardware reference key and/or a hardware reference key is intended to attest to the identity of a computing device that generated the key that could be construed as personal information data, if correlated with the identity of a user. A manufacturer's privacy certificate authority is intended to store the identity of the computing device rather than the identity of a user or the services accessed by the user with the computing device.

The present disclosure recognizes that the use of such personal information data, here the identity of a computing device, in the present technology, can be used to the benefit of users. For example, the personal information data can facilitate access to services by the user with the computing device. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 4 illustrates example registers, key space, and descriptions of fields of a seed register, in accordance with some embodiments.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Figure 1:
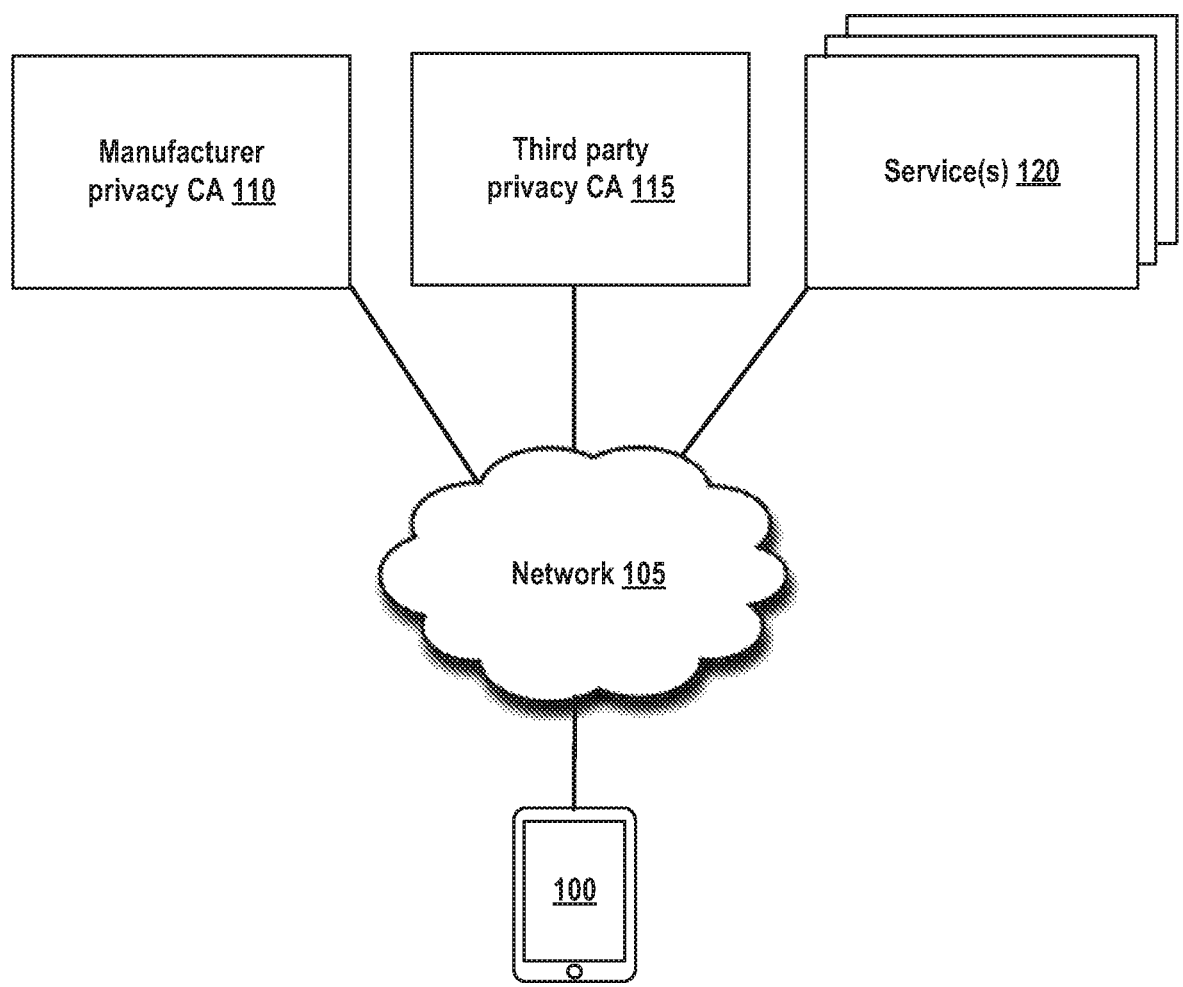
FIG. 1 illustrates, in block form, an overview of a system wherein a user accesses a service using secure methods.

FIG. 1 illustrates, in block form, an overview of a system wherein a user accesses a service using secure methods.

A user of a computing device 100 can access a service 120 across a network 105. Network 105 can be any type of network including an Ethernet network, a token ring network, the Internet, a USB network, a wireless network, a cellular network, or other type of network.

The computing device 100 can be a tablet computer, such as an iPad®, a desktop computer, such as an iMac®, or a portable device such as a smart phone, e.g. an iPhone®. Example internal hardware components of a computing device 100 are described below with reference to FIG. 11.

A service 120 can be any type of service, such as a banking service, an online retail service, such as Amazon® or Apple iTunes®, or other service that requires verification of the identity of the user, and/or the computing device 100 that the user is using to access the service 120.

A computing device 100 can generate one or more hardware reference keys (HRK) that can uniquely identify one or more attributes of the computing device 100. An attribute can include an identifier of the processor being used in the computing device 100, such as the Apple® A9 processor class, a unique identifier associated with the computing device such as a BIOS ID, a CPU ID, or other unique system identifier. Attributes can further include version identification information of an operating system associated with the computing device.

An HRK can include these attributes in a hardware reference attestation key (HRKA) that can uniquely and securely identify the computing device 100 to a privacy CA or a requesting service. In an embodiment, a seed used to generate the HRK can be encrypted using the Advanced Encryption Standard (AES). A public key accelerator (PKA) module can generate the HRK using the encrypted seed. In an embodiment, the HRK key can comprise an asymmetric key pair having a public portion and a private portion. In an embodiment, the HRKs can be produced using Elliptical Curve cryptography.

A system for accessing a service using secure methods can further include a manufacturer privacy certification authority (CA) 110 or a third party privacy CA 115 ("privacy CA") to attest to the validity of an HRK. In an embodiment, the privacy CA can receive an HRKA attesting to an HRK from a computing device and return an X509 certificate to the computing device. In an embodiment, a service 120 may choose to use a third party privacy CA 115 over the manufacturer privacy CA 110 so that the manufacturer cannot track the certificate requests from the computing device 100 and further cannot track the computing device's 100 access of a particular service 120.

Computing device 100 can access service 120 using an HRK. In response, service 120 can issue a challenge to computing device 100 requesting an X509 certificate verifying the HRK. In an embodiment, the service 120 challenge can include a nonce. Computing device 100 can then generate an HRKA attesting to the validity of the HRK presented to the service 120. In an embodiment, the HRKA can contain information that uniquely identifies the computing device 100 to a privacy CA. The HRKA can include a seed used to generate the HRK, an indication of an operating system version that was running at the time the HRK was generated, and chip identifiers including a processor type or class identifier, EC_ID, and a unique chip identifier, CHIP_ID. Computing device 100 can then present the signed HRKA to the privacy CA. The privacy CA can have previously stored the EC_ID, CHIP_ID, and public key used to sign the HRKA. The information stored at the privacy CA is sufficient to decode and verify the signed HRKA presented by the computing device 100. Privacy CA can then generate and return an X509 certificate to the computing device 100. In turn, computing device 100 can return the X509 certificate to the service 120 in response to the service's 120 initial challenge. The service 120 can decode the X509 certificate to determine the operating system version and processor type running on the computing device 100 at the time the HRK was generated. Service 120 can then decide whether service 120 trusts the version of the operation system, and/or the processor type, running on the computing device 100 at the time the HRK was generated sufficiently to allow access to service 120. Service 120 can then determine whether to accept the HRK to allow access to service 120, or to require additional authentication such as user credentials.

Figure 2A:
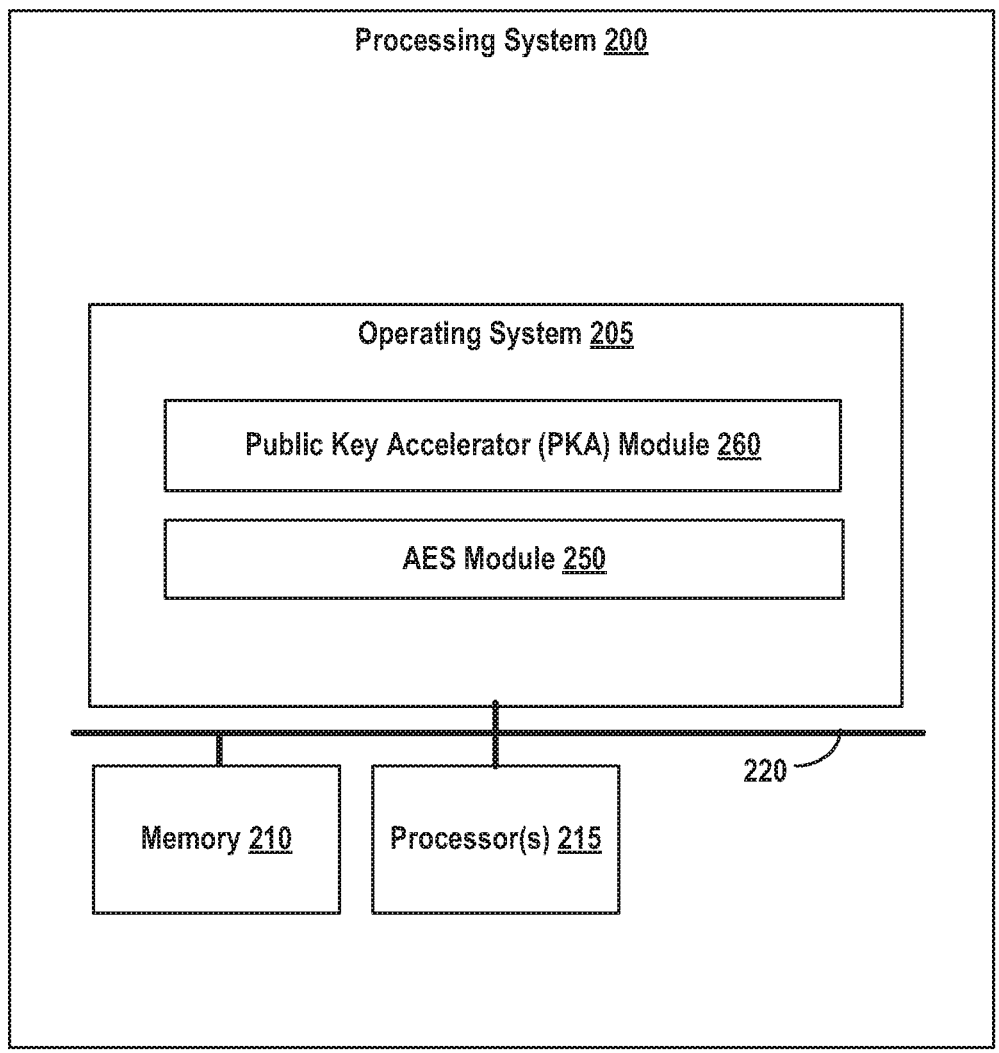
FIGS. 2A-2C illustrate, in block form, internal components of a computing device that accesses a service using secure methods in accordance with some embodiments.
Figure 2B:
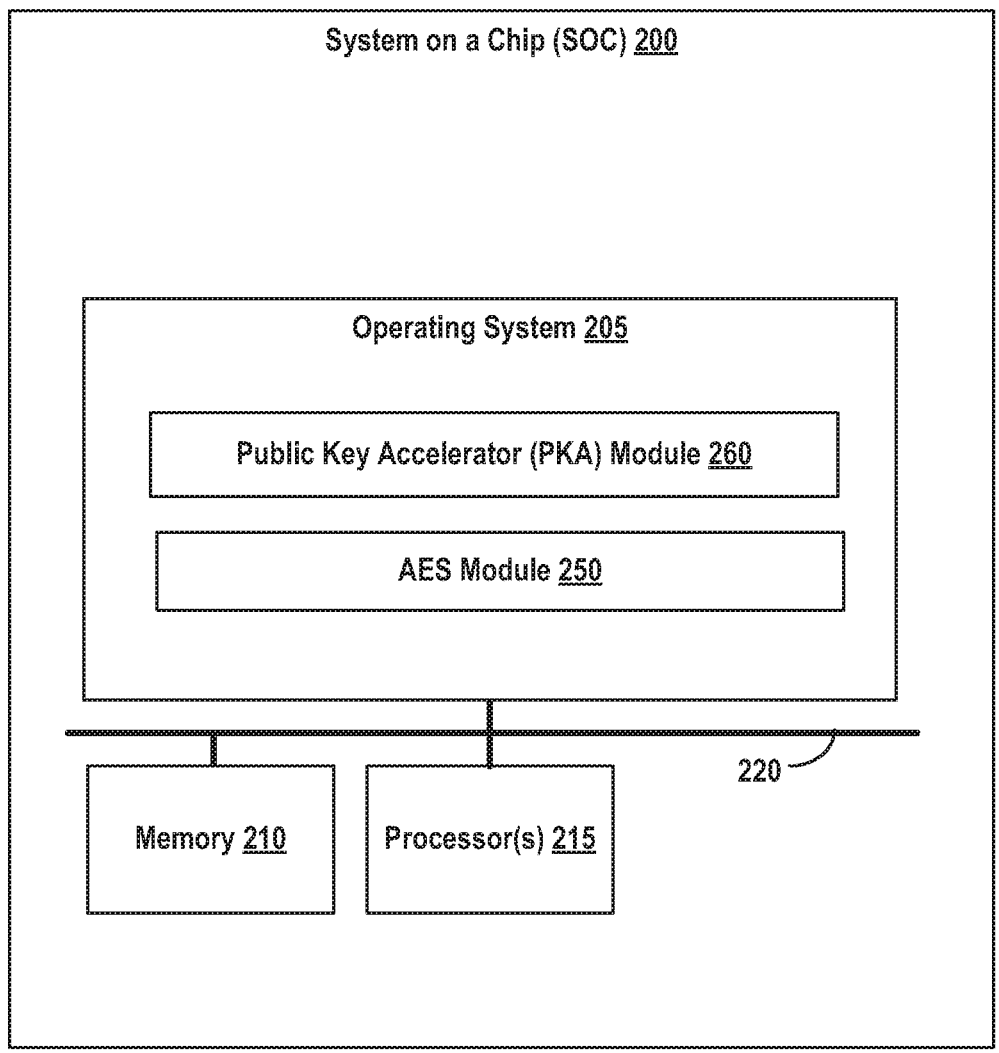
Figure 2C:
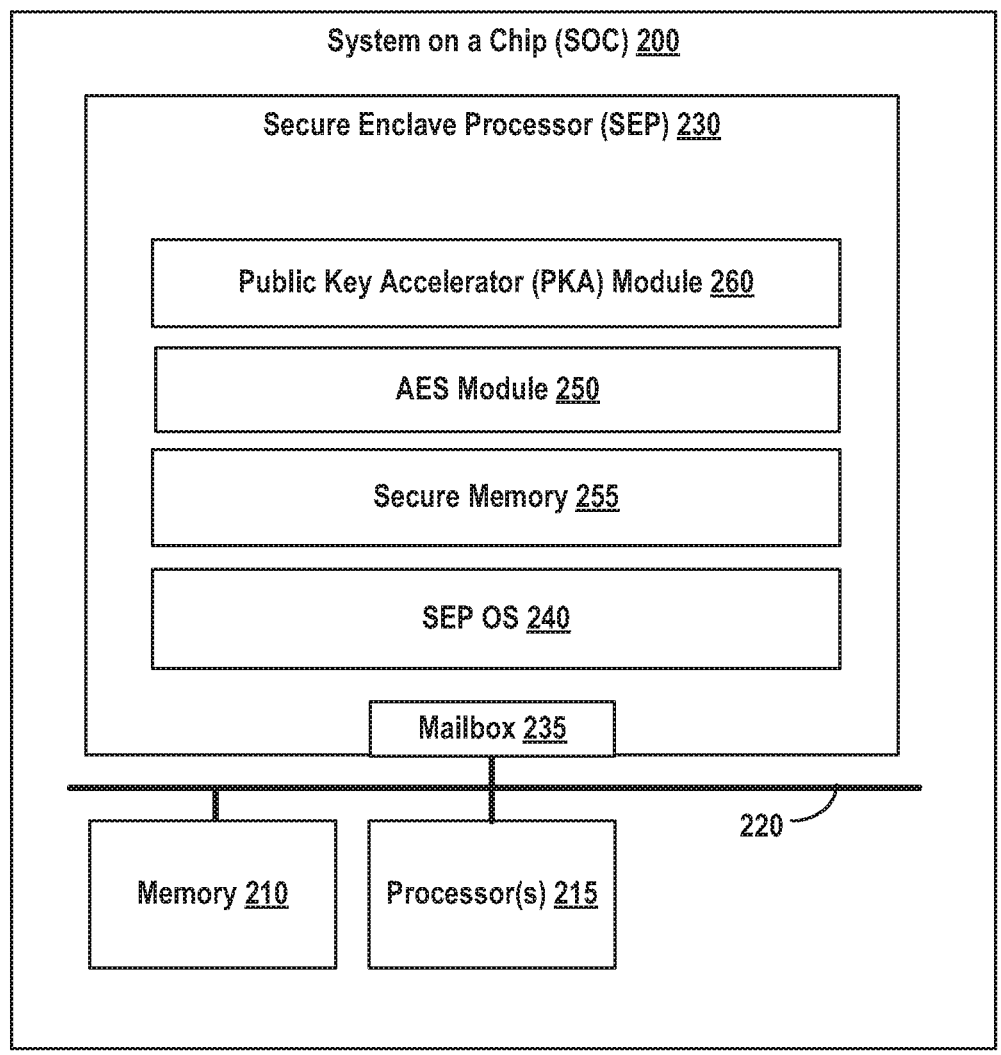

FIGS. 2A-2C illustrate, in block form, internal components of a computing device 100 that can access a service 120 using secure methods in accordance with some embodiments. The internal components can include a processing system 200 that performs functions including the generating of one or more hardware reference keys (HRK), securely storing the HRKs, and attesting that the processing system type (e.g. processor type), operating system version running at the time of generating the one or more HRKs, and other features of the processing system that ensure identification of the processing system that generated the HRKs. A confidence or trust level can be assigned by service provides as to how much an HRK is to be trusted in authentication. For example, a processing system that comprises a system-on-a-chip that includes secure memory and a secure enclave processor (SEP) may be given a higher trust level than a processing system that comprises a memory accessed by a kernel processes running on a general purpose processor.

With reference to FIG. 2A, a processing system 200 of a computing device 100 can include memory 210, one or more processors 215, and an operating system 205. Operating system 205 can further include a cryptographic key generation module, such as AES module 250, and a public key accelerator (PKA) module 260. The internal components of a processing system 200 can be interconnected by a bus 220. The functionality of the PKA module 260 will be described further, below, with reference to FIGS. 3A and 3B.

With reference to FIG. 2B, a processing system 200 of a computing device 100 can, in an embodiment, comprise a system-on-a-chip (SOC) 200. SOC 200 can include memory 210, one or more processors 215, and an operating system 205. Operating system 205 can further include a cryptographic key generating module, such as AES module 250, and a public key accelerator module 260. The internal components of a processing system 200 can be interconnected by a bus 220. The functionality of the PKA module 260 will be described further, below, with reference to FIGS. 3A and 3B.

With reference to FIG. 2C, a processing system 200 of a computing device 100 can comprise an SOC 200 having memory 210, one or more processors 215, and a secure enclave processor (SEP) 230 interconnected by a bus 220. In an embodiment, the system on a chip 200 can communicate with other SOC 200 components across bus 220 via a mailbox 235. In an embodiment, internal components of the SEP 230 are not accessible from outside the SEP 230. Internal components of the SEP 230 can include an SEP operating system (SEP OS) 240, a secure memory 255, a cryptographic key generating module such as AES module 250, and a public key accelerator module 260. The functionality of the PKA module 260 will be described further, below, with reference to FIGS. 3A and 3B.

Figure 3A:
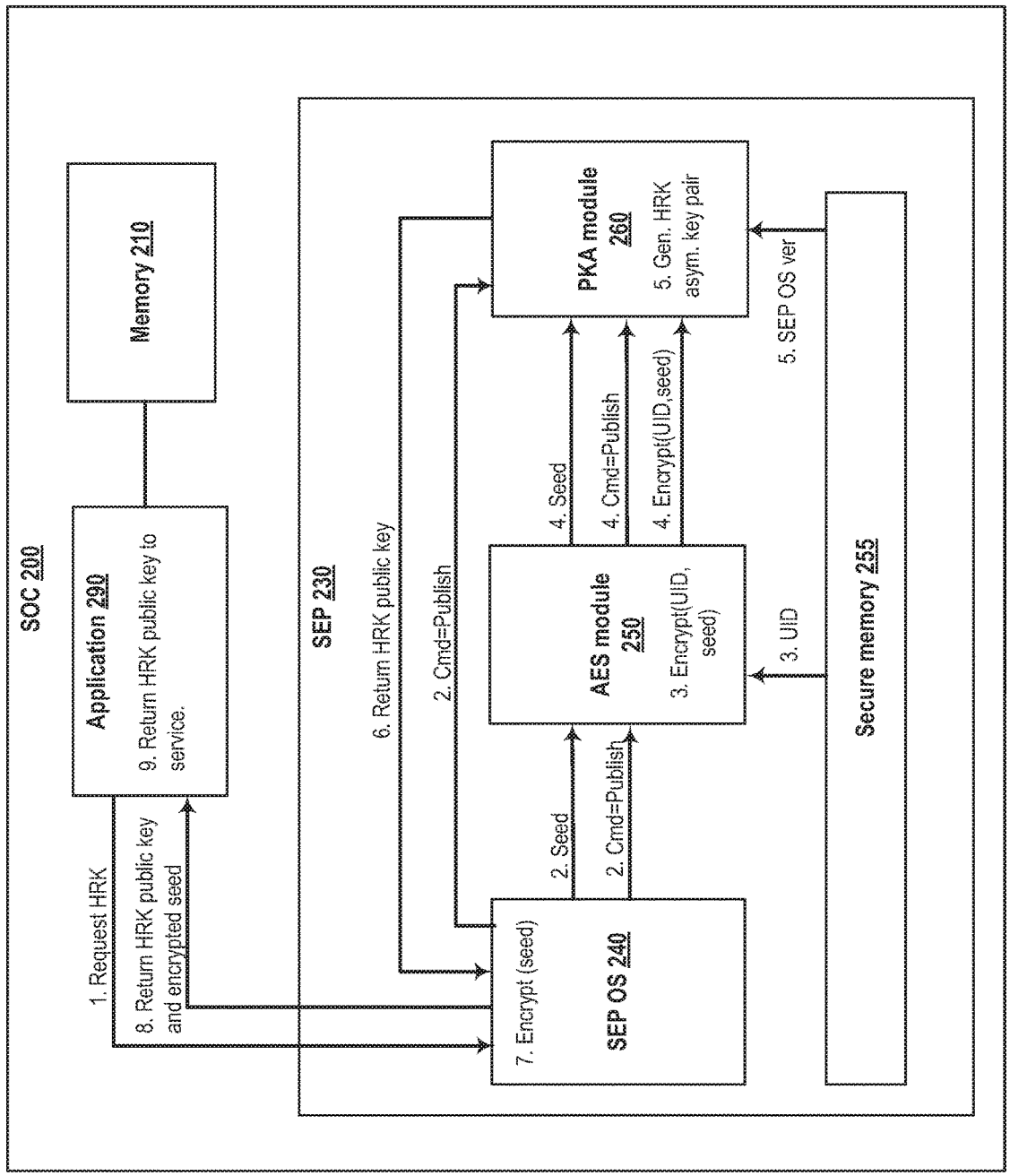
FIG. 3A illustrates, in block form, internal components of a secure enclave processor in a computing device that can generate a hardware reference key, in accordance with some embodiments.

FIG. 3A illustrates, in block form, internal components of a secure enclave processor (SEP) 230 in a computing device 100 that can generate a hardware reference key (HRK), in accordance with some embodiments. An embodiment of the operation of the internal components of the SOC 200 having an SEP 230, as shown in FIG. 2C, above, is being used as an example of a hardware embodiment of the inventive concepts described herein. It is understood that the inventive concepts can be implemented using the SOC 200 that has no SEP 230, as shown in FIG. 2B, and a computing system as shown in FIG. 2A, above. The embodiment shown in FIG. 2C will generally provide better security than other embodiments because the internal components of the SEP 230 are hardware-isolated from other computing components of the computing device 100 by the mailbox 235 of the SEP 230.

When a user first accesses a service 120, a user can use login credentials to authenticate the user. Once logged in, service 120 can request an HRK to associate with the user authentication credentials. Service 120 can, at this time, also request an assurance of the validity of the HRK, such as an X509 certificate based upon the HRK. In addition, or alternatively, service 120 can request an X509 certificate when a user next accesses service 120 using only the HRK.

An application 290, that is used to access service 120, can receive a request for an HRK from the service 120. SEP OS 240 can receive the request from the application 290 to provide an HRK. Operations for producing an HRK as shown in FIG. 3A are further described with respect to FIG. 6, below.

In response to the request, SEP OS 240 can generate a seed for passing to an encryption module, such as AES Module 250. In addition, the seed can further include key usage bits that indicate how the PKA module is to use the seed when it receives the seed. The seed can further include a random portion. In an embodiment, the seed can comprise 48 bytes (384 bits). SEP OS 240 can then pass to AES module 250, the seed, and a command indication that the PKA module 260 should publish an HRK in response to the request for an HRK.

AES module 250 can receive the seed and command. In response, AES module 250 can read a UID from the secure memory that uniquely identifies the processor. AES module 250 can then encrypt the UID and seed. AES module 250 can then pass seed, command to publish an HRK, and the encrypted UID and seed to PKA module 260.

PKA module 260 can then read the current operating system version from secure memory 255 and generate an HRK using the encrypted UID and seed. The HRK can be an asymmetric key pair. PKA module 260 can discard the private portion of the HRK. PKA module 260 can check the attestation bit within the seed to determine whether an attestation key should be generated. When the command indication is to publish the HRK public key the PKA module 260 can return the HRK public key to the SEP OS 240. Other command indications sent to the PKA module 260 can check the attestation bit to determined whether that command should be allowed or rejected.

The SEP OS 240 can receive the HRK public key from the PKA module 260. SEP OS 240 can then encrypt the seed using any key available to it, including the HRK. SEP OS 240 can then return the HRK public key and encrypted seed to application 290. In an embodiment, application 290 can store the HRK public and encrypted seed in memory 210. Application 290 can then pass the HRK to the requesting service 120.

Figure 3B:
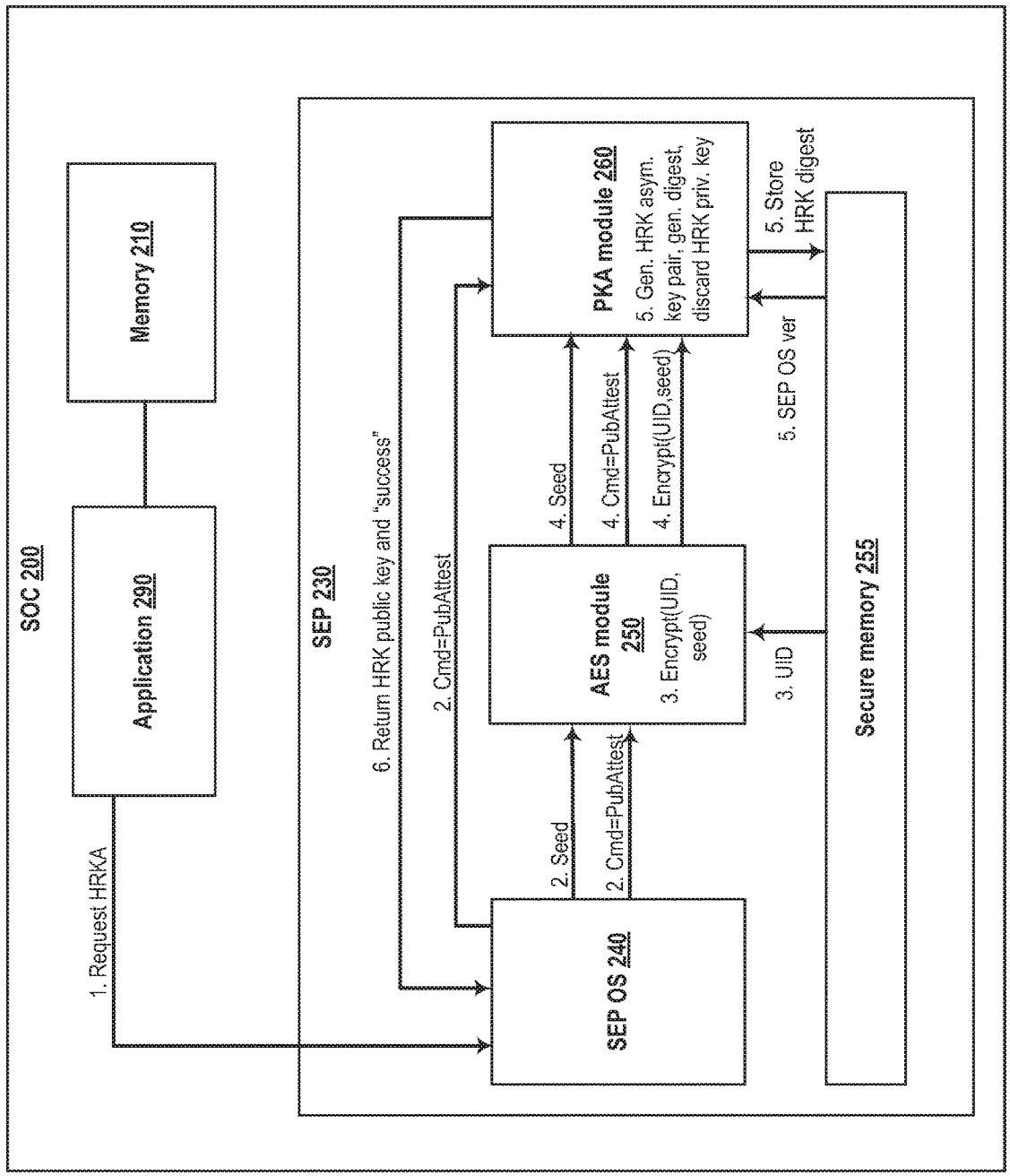
FIGS. 3B and 3C illustrate, in block form, internal components of a secure enclave processor in a computing device that can generate a hardware reference key attestation, in accordance with some embodiments.

FIG. 3B illustrates, in block form, internal components of a secure enclave processor (SEP 230) in a computing device 100 that can generate a hardware reference key attestation (HRKA), in accordance with some embodiments.

After an HRK asymmetric key pair has been generated, an HRKA can be generated that attests that the PKA module 260 of the computing device 100 did generate the HRK. The HRKA can attest to the processor type or class of the computing system, and a unique identifier computing system, and the version of the SEP OS that was running when the HRK was generated.

Figure 3C:
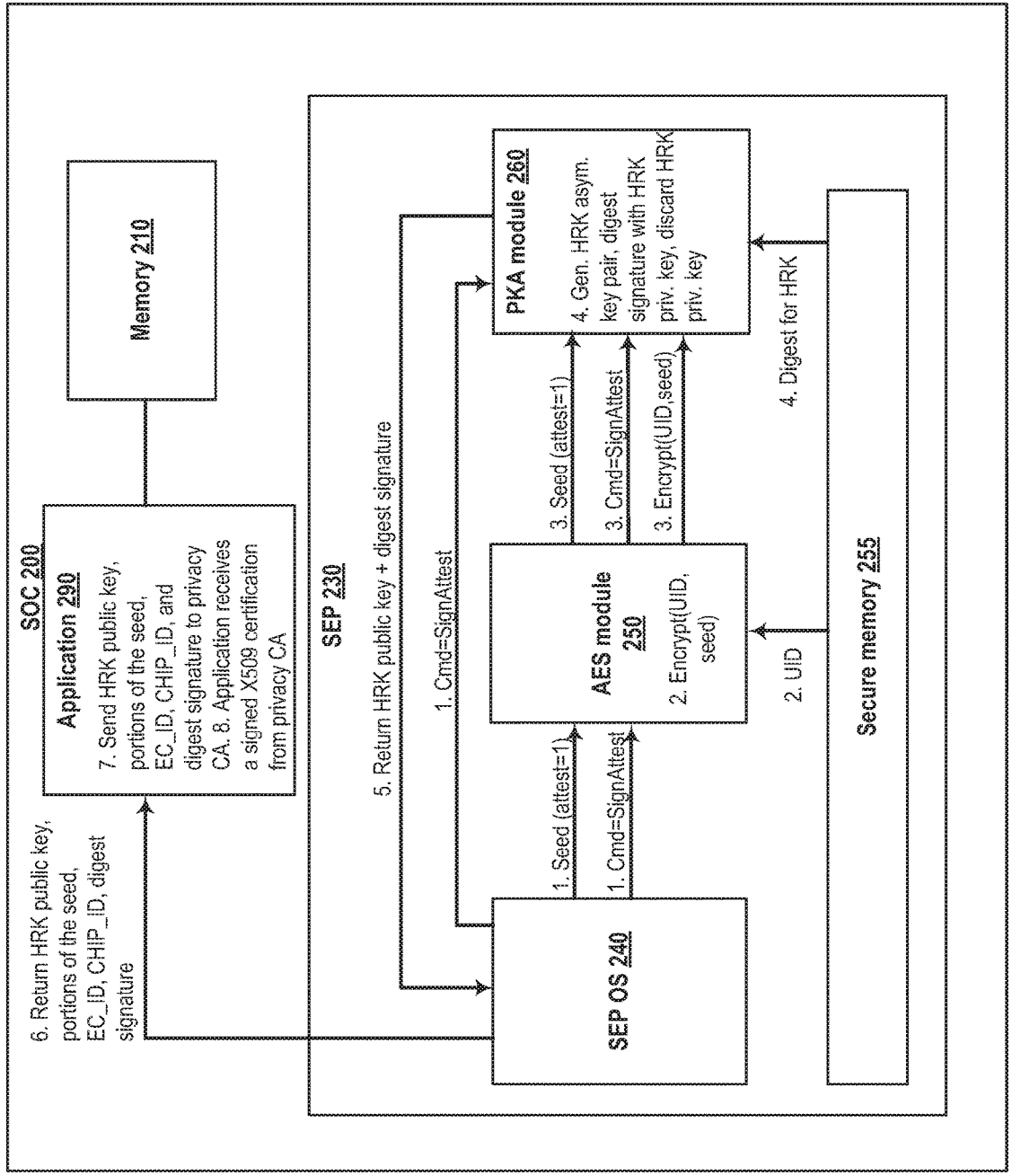

An application 290, that is used to access service 120, can receive a request for verification of an HRKA from service 120. Computing device 100 can generate an HRKA that attests to the HRK. Operations for producing an HRKA as shown in FIGS. 3B and 3C are further described with respect to FIGS. 7A and 7B, below.

In response to the request from the application 290 for an HRKA, SEP OS 240 can generate a seed for passing to an encryption module, such as AES Module 250. In addition, the seed can further include key usage bits that indicate how the PKA module 260 is to use the seed when it receives the seed. The seed can further include a random portion. In an embodiment, the seed can comprise 48 bytes (384 bits). SEP OS 240 can then pass to AES module 250, the seed, and a command indication "PubAttest" that the PKA module 260 should generate an attestation to an HRK in response to the request for an HRKA.

AES module 250 can receive the seed and command. In response, AES module 250 can read a UID from the secure memory 255 that uniquely identifies the processing system 200. AES module 250 can then encrypt the UID and seed. AES module 250 can then pass seed, command to publish an HRK, and the encrypted UID and seed to PKA module 260.

PKA module 260 can then read the current operating system version from secure memory 255 and generate an HRK symmetric key pair and a digest of the key pair. The digest can include the HRK public key, the seed protection bits, the random portion of the seed, identifying information of the operating system version read from secure memory 255, and the EC_ID that identifies the processing system class or type, and the CHIP_ID that uniquely identifies the processing system that generated the HRK. PKA module 260 can discard the private portion of the HRK. PKA module 260 can store the digest in secure memory 255 for use by other PKA module 260 operations. PKA module 260 can return the HRK public key to the SEP OS 240.

With reference to FIG. 3C, computing device 100 can generate a signed version of the HRK digest stored in operations described in FIG. 3B, above.

SEP OS 240 can generate a seed for passing to an encryption module, such as AES Module 250. In addition, the seed can further include key usage bits that indicate how the PKA module 260 is to use the seed when it receives the seed. One key usage bit, the "attest" bit, can be set for the following operations. The seed can further include a random portion. In an embodiment, the seed can comprise 48 bytes (384 bits). SEP OS 240 can then pass to AES module 250, the seed, and a command indication "SignAttest" that the PKA module 260 should sign the HRKA data previously generated.

AES module 250 can receive the seed and command. In response, AES module 250 can read a UID from the secure memory 255 that uniquely identifies the processing system 200. AES module 250 can then encrypt the UID and seed. AES module 250 can then pass the seed, command to sign the HRKA digest, and the encrypted UID and seed to PKA module 260.

PKA module 260 can read the previously generated digest for the HRK that was stored in secure memory in operations described with reference to FIG. 3B. PKA module 260 can then generate an HRK that may be different from the HRK generated in FIG. 3B and use the private portion of that HRK generated in FIG. 3C to sign the HRK digest generated in FIG. 3B. The digest can include the HRK public key from FIG. 3B, seed protection bits, the random portion of the seed, identifying information of the operating system version read from secure memory 255, and the EC_ID that identifies the processing system class or type, and the CHIP_ID that uniquely identifies the processing system that generated the HRK. PKA module 260 can then discard the private portion of the HRK. PKA module 260 can then return the HRK public key and digest signature to SEP OS 240.

SEP OS 240 can then return the HRK public key and digest signature to application 290.

Application 290 can send the HRK public key, seed protection bits, the random portion of the seed, identifying information of the operating system version read from secure memory 255, and the EC_ID that identifies the processing system class or type, the CHIP_ID that uniquely identifies the processing system that generated the HRK, and digest signature to privacy CA 110 or 115. Privacy CA 110 or 115 can then generate and return a signed X509 certificate to the application. Application 290 can then return the X509 signed certificate to a service 120 that previously issued a challenge to an HRK submitted by the application 290 in request for services from service 120.

FIG. 4 illustrates example registers, key space, and descriptions of fields of a seed register, in accordance with some embodiments.

SEP registers can comprise a portion of secure memory 255 within SEP 230. Registers can include a GID register 405, a UID register 410, an SIK digest 415 of an initial silicon hardware reference key (SIK). A register 425 can store the current SEP OS 240 version information.

GID register 405 can comprise an identifier that is common to a class of processors, such as the Apple® A9 processor, or other processing system 200.

UID register 410 can comprise an identifier that uniquely identifies the computing device 100. In an embodiment, the UID 410 can uniquely identify an SOC 200 within the computing device 100. In an embodiment, the UID can be randomly and uniquely chosen by the SOC 200, such as during the manufacturing process of the SOC 200.

The SIK can be a public key and private key asymmetric key pair generated from the UID. In an embodiment, the SEP 230 can generate the SIK asymmetric key pair using the processes described herein for other hardware reference keys. The SIK public key can be stored in a manufacturer's database to authenticate hardware reference keys generated by the SEP 230 for the computing device 100. In an embodiment, the SIK can generated from the UID 410 and signed by the GID 405, such that the SIK is identified to have been generated by the class of SOC processor 200 given by the GID 405, and the specific, uniquely identified SOC processor having the UID 410.

The SIK digest 415 can be generated by signing the SIK digest using the SIK private key. The SIK can be regenerated at any time using the UID, and thus need not be stored. Similarly, the SIK attestation key (SIKA) can be regenerated using the SIK and SIK digest, and thus also need not be stored.

Key space 430 can include any number of hardware reference keys (HRK), each having a HRK public key 435 and a digest of the HRK 440 for the HRK. As described above, with reference FIGS. 3B and 3C, and HRK digest can be stored temporarily in secure memory while a signed attestation of the HRK digest is being generated.

A seed 450 used by the AES module 250 and PKA module 260 can comprise 48 bytes. In an embodiment, 4 of the bytes 455 hold information about the application within the SEP OS 240 that requested generated of the HRK. A silicon key generation (SKG) application (not shown) within the SEP OS 240 can request HRK generation. A touch ID application (not shown) within the SEP OS 240 can also request HRK generation functionality of the SEP OS 240. SEP application identification 455 can be used by the SEP OS and its modules to determine the source of a request for HRK generation.

A seed 450 can further comprise 4 bytes of key usage information with specified bits, shown by way of illustration and not limitation. Bit 1 can represent whether a key generation is process is to generate an attestation key. Bit 2 can represent whether all of the seed is to be used in generating an HRK. Bit 3 can be used to indicate whether to use the SEP OS version in generating an HRK. Bit 4 can indicate whether the EC_ID and CHIP_ID are to be used in the generating a digest for an attestation key. Bit 5 can indicate that the GID is to be used in generating an HRK. Further bits can be reserved for future use.

A remainder 470 of the seed 450 can be used, in one embodiment 40 bytes, to generate a random number or other random input when generating an HRK.

Figure 5:
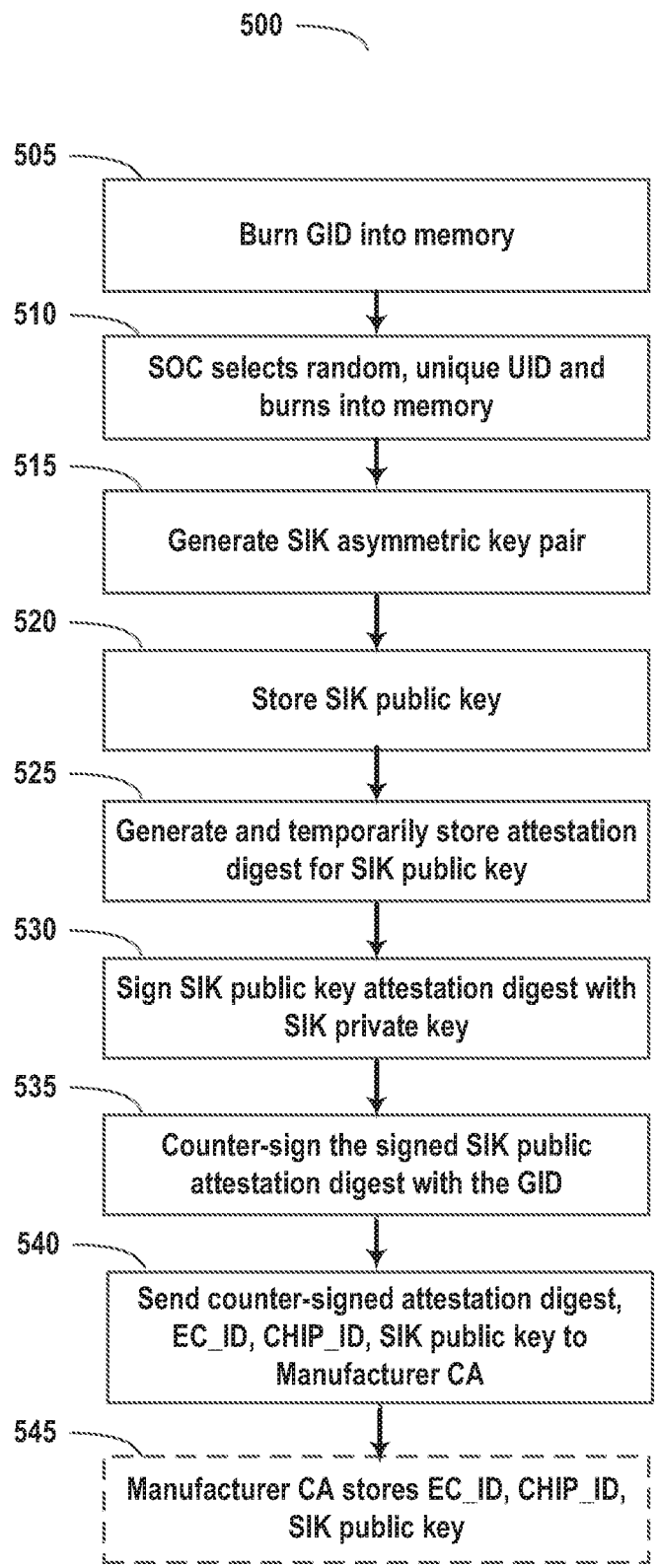
FIG. 5 illustrates a method of generating a silicon hardware reference key in a computing device, according to some embodiments.

FIG. 5 illustrates a method 500 of generating a silicon hardware reference key (SIK) in a computing device, according to some embodiments.

In operation 505, typically performed at a manufacturing facility, a GID 405 of the SOC 200 can be burned into a register in memory. As described above, the GID 405 indicates a class of processor or SOC 200 of the computing device 100.

In operation 510, SOC 200 can randomly select a unique UID 410 for the SOC 200 and burn the UID into memory.

In operation 515, SOC 200 can generate an asymmetric hardware reference key pair. In an embodiment, one or both of the GID and UID can be input into the AES module 250 to generate the asymmetric HRK pair. The resulting key pair is the silicon hardware reference key SIK.

In operation 520, the SIK HRK public portion can be stored in secure memory 255 of SEP 230.

In operation 525, PKA module 260 can generate and store a digest of the SIK HRK. In an embodiment, the SIK digest can include the SIK public key, a seed used to generate the SIK, and chip identifiers including a processor type or class identifier, e.g. EC_ID and a unique chip identifier, e.g. CHIP_ID.

In operation 530, PKA module 260 can sign the SIK public key attestation digest with the SIK private key.

In operation 535, PKA module 260 can counter-sign the signed SIK public key attestation digest with the GID.

In operation 540, SOC 200 can optionally transmit the SIK public key, EC_ID, CHIP_ID, and counter-signed digest to a manufacturer's privacy certification authority.

Figure 6:
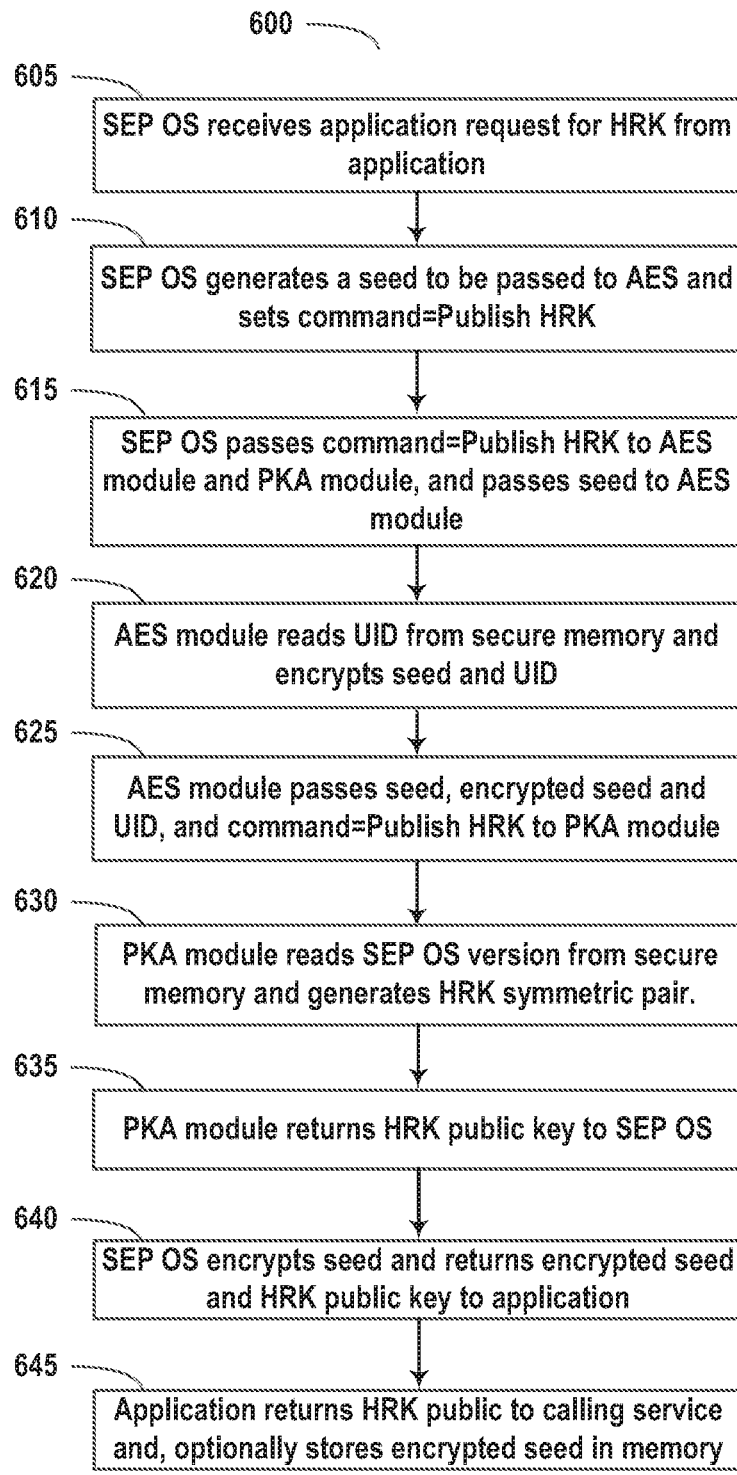
FIG. 6 illustrates a method of publishing a hardware reference key, according to some embodiments.

FIG. 6 illustrates a method 600 of publishing a hardware reference key (HRK), according to some embodiments. A flow of operations for generating an HRK is described above, with reference to FIG. 3A.

In operation 605, SEP OS 240 can receive a request from an application 290 to return an HRK for use in requesting access to a service 120.

In operation 610, SEP OS 240 can generate a seed to be passes to AES module 250 and pass a command to publish the generated HRK.

In operation 615, SEP OS 240 can pass the command seed to the AES module 250. An attestation bit in the seed can be cleared, indicating that the PKA module is to generate an HRK, and not an attestation key. A bit can be set to use the operating system version information when generating the HRK.

In operation 620, AES module 250 can read the UID from secure memory 255. AES module can then encrypt the seed and UID for passing to the PKA module 260.

In operation 625, AES module 250 pass the seed, encrypted seed and UID, and command to publish the HRK, to PKA module 260.

In operation 630, PKA module 260 can read the SEP OS 240 version from secure memory 255 and generate the HRK. In an embodiment, the HRK comprises and asymmetric key pair.

In operation 635, PKA module 260 can discard the private portion of the HRK and return the public portion of the HRK to the SEP OS 240.

In operation 640, SEP OS 240 can encrypt the seed using any key available, such as the HRK or SIK.

In operation 645, SEP OS 240 can return the encrypted seed and HRK public key to the requesting application 290.

Figure 7A:
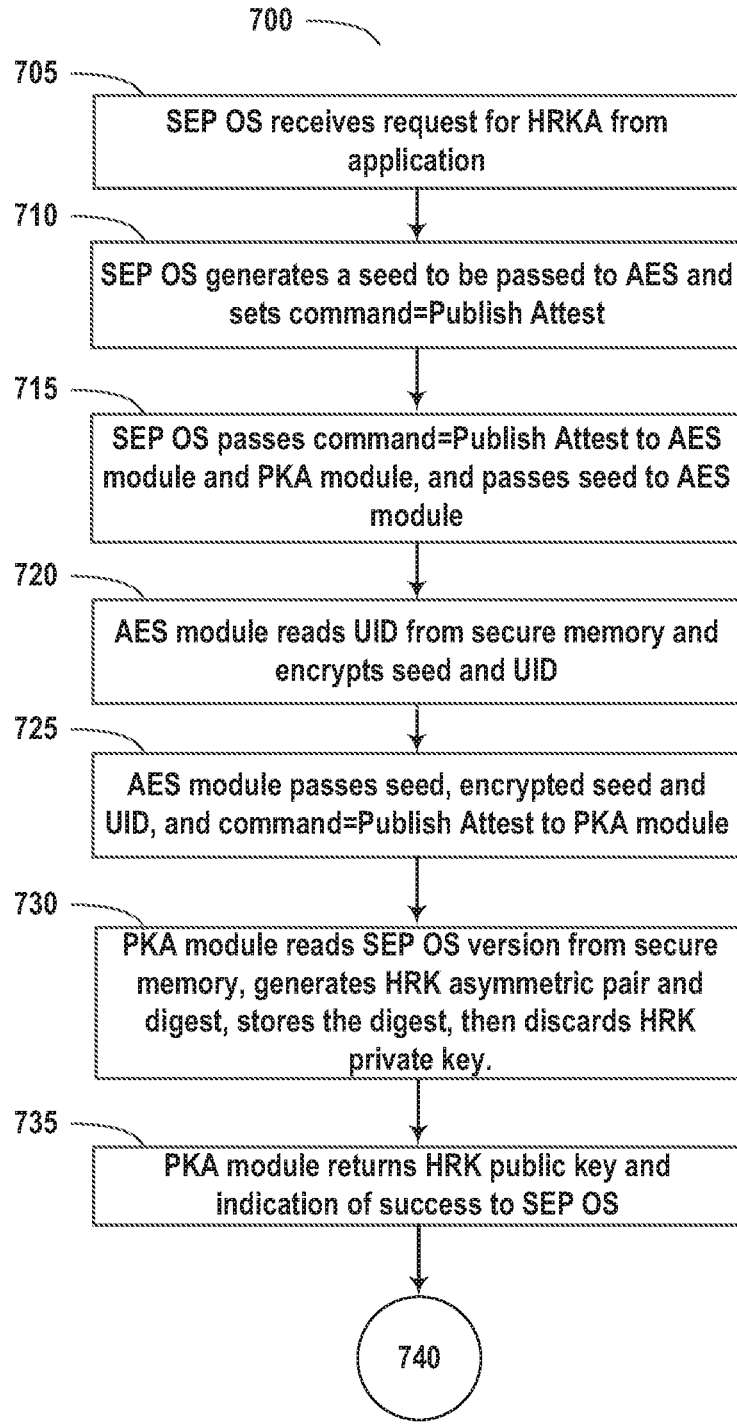
FIGS. 7A and 7B illustrate a method of generating and using a hardware reference key attestation, according to some embodiments.
Figure 7B:
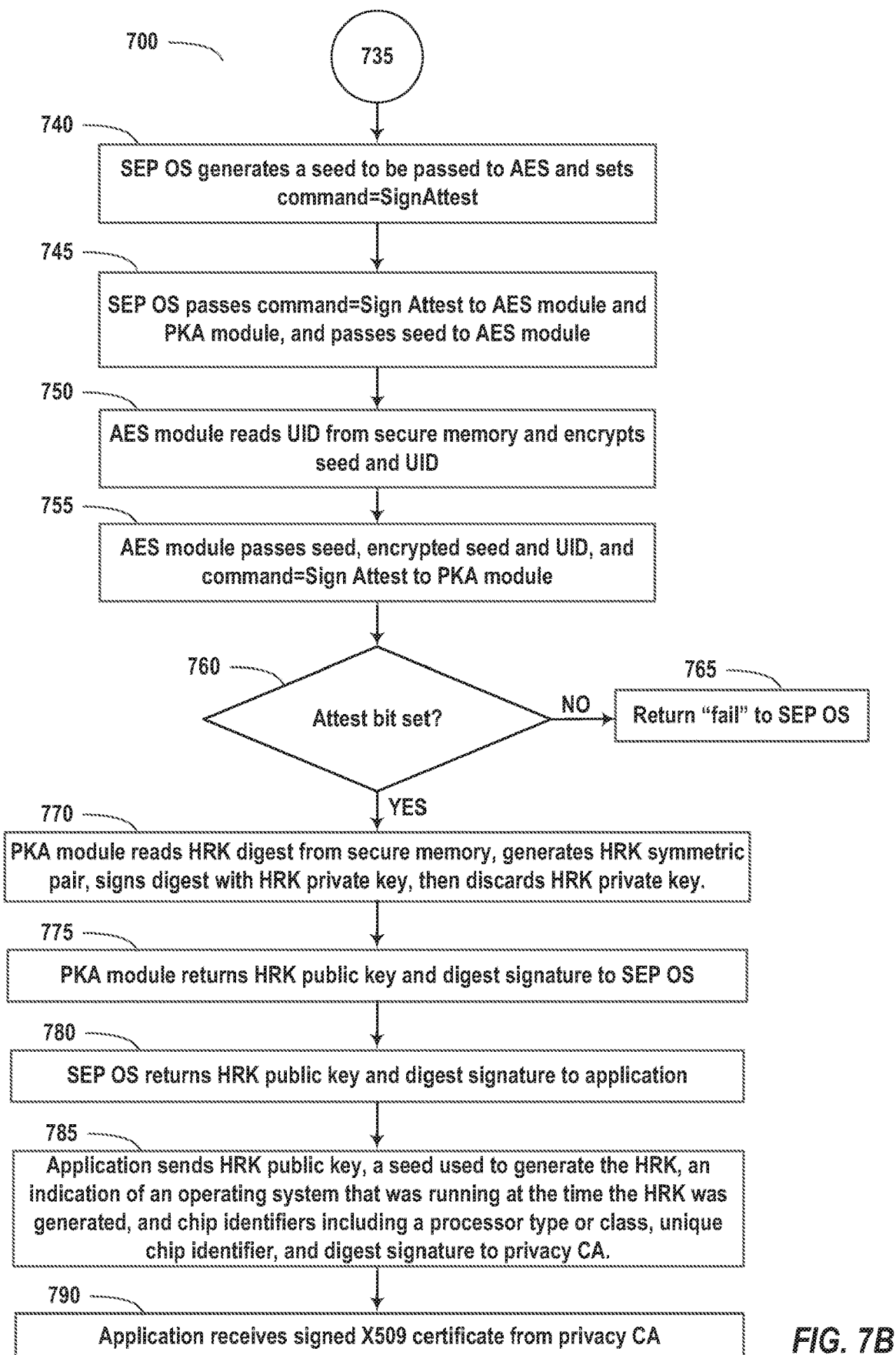

FIGS. 7A and 7B illustrate a method 700 of generating a hardware reference key attestation, according to some embodiments. In FIG. 7A, generating a hardware reference key attestation digest is described. In FIG. 7B, further operations are described that use the hardware reference key attestation digest.

In FIG. 7A, operation 705, SEP OS 240 can receive a request from an application 290 to return a hardware reference key attestation (HRKA) so that application 290 can obtain an X509 certificate from a privacy CA 110 or 115, based upon the HRKA and HRK. The request from application 290 can include the HRK public key to which the PKA module 260 is to attest, and the SEP OS 240 application that requests the HRKA generation (e.g. SKG or Touch ID applications).

In operation 710, SEP OS 240 can generate a seed to be passed to AES module 250. SEP OS 240 can set a command indication to "Publish Attest." The command instructs the PKA module 260 as to the functionality it is to perform. In an embodiment, the seed can have an attestation bit set to indicate to the PKA module 260 module that the PKA module 260 is to perform an attestation operation.

In operation 715, SEP OS 240 can pass the seed and a command instruction to the PKA module 260. The command instruction indicates that the PKA module is to generate a hash or digest of the HRK public key.

In operation 720, AES module 250 can read the UID of the chip from secure memory 255 and encrypt the seed and UID.

In operation 725, the AES module 250 can pass the seed, encrypted seed and UID, and command to publish an HRK, to the PKA module 260.

In operation 730, PKA module can read the SEP OS 240 version from secure memory. PKA module 260 can then generate an HRK asymmetric key pair, and a digest of the HRK. The HRK private key portion can be discarded. In an embodiment, the SEP OS 240 version information can be added to a digest of the HRK. The digest can further include the EC_ID of the processing system 200, that indicates the class or type of processing system 200, and the CHIP_ID that uniquely identifies the processing system 200. The digest can further include the encrypted seed and UID. PKA module 260 can store the HRK digest in secure memory 255.

In operation 735, PKA module 260 can return the HRK public key portion and an indication of success of generating the HRK digest.

With reference to FIG. 7B, operations are described for using the HRK digest generated in FIG. 7A.

On FIG. 7B, operation 740, SEP OS 240 can generate a seed to be passed to AES module 250 and an indication of a command ("SignAttest") that PKA module 260 is to sign the previously generated HRK digest to generate an HRKA for the HRK.

In operation 745, SEP OS 240 passes the seed and command to AES module 250. SEP OS 240 also passes the command to PKA module 260.

In operation 750, AES module 250 can read the UID of the processing system 200 from secure memory 255. AES module 250 then encrypts the seed and UID.

In operation 755, AES module 250 passes the seed, command, and encrypted seed and UID to PKA module 260.

In operation 760, PKA module 260 can examine the attest bit of the seed to determine whether the bit is set, indicating that the PKA module 260 is to perform an attestation operation.

If, in operation 760, the attestation bit is not set, PKA module 260 can return a failure status to SEP OS 240. Otherwise, the method 700 continues at operation 770.

In operation 770, PKA module 260 can read the previously generated HRK digest from secure memory 255. PKA module 260 can generate and HRK key pair, and sign the HRK digest with the HRK private key portion. Then, PKA module 260 can discard the HRK private key portion.

In operation 775, PKA module 260 can return the HRK public key and digest signature to SEP OS 240.

In operation 780, SEP OS 240 returns the HRK public key and digest signature to the requesting application 290.

In operation 785, application 290 can send the HRK public key, a seed used to generate the HRK, an indication of an operating system version that was running at the time the HRK was generated, and chip identifiers including a processor type or class identifier, EC_ID, and a unique chip identifier, CHIP_ID and digest signature to privacy CA 110 or 115.

In operation 790, application 290 receives a signed X509 certificate from privacy CA 110 or 115.

Figure 8:
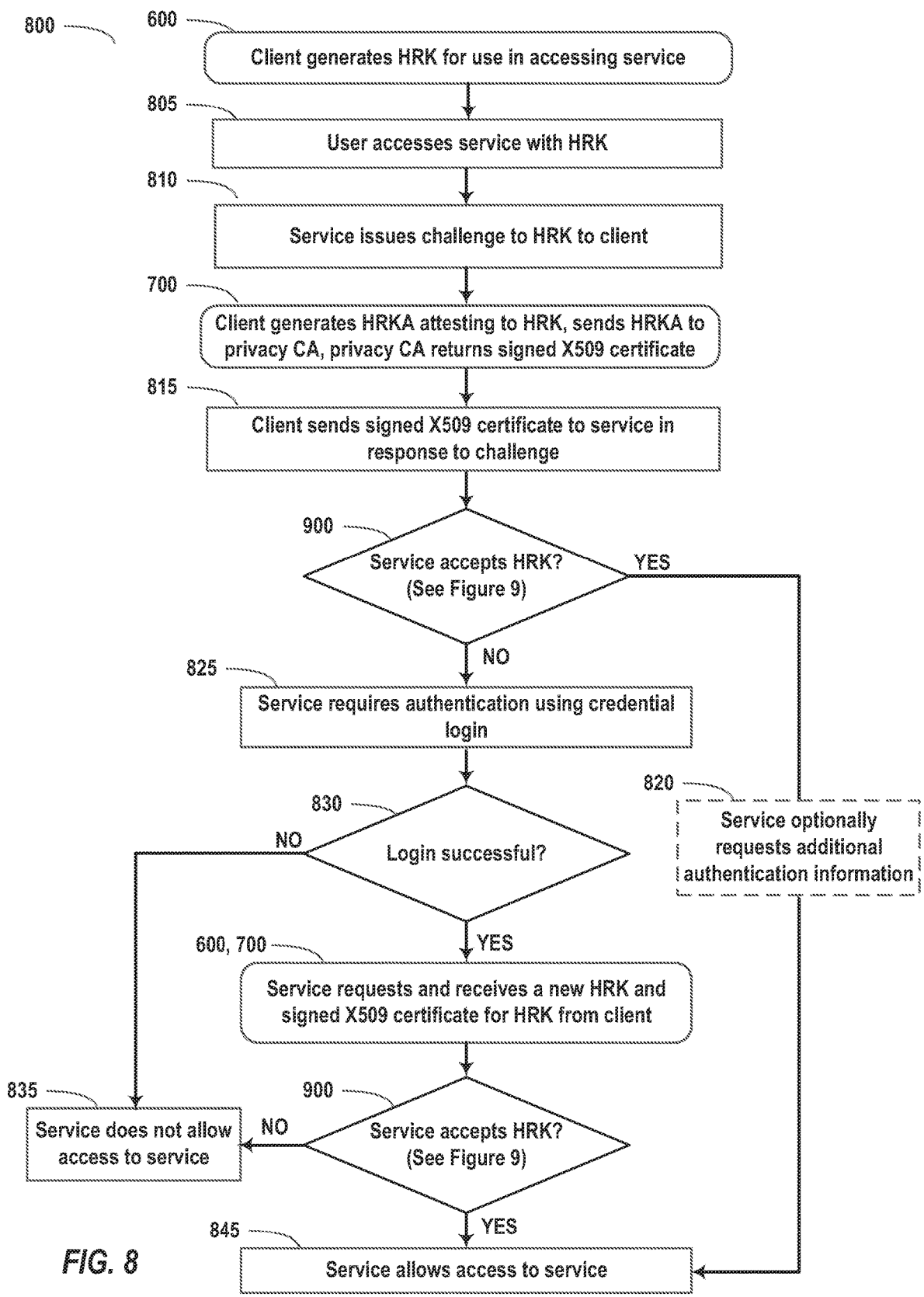
FIG. 8 illustrates a method of using a hardware reference key and, optionally, a hardware reference key attestation, according to some embodiments.

FIG. 8 illustrates a method 800 of using a hardware reference key (HRK) and, optionally, a hardware reference key attestation (HRKA), according to some embodiments. Operations of FIG. 8 begin with an application 290 of computing device 100 preparing to access service 120 by requesting an HRK to access service 120. Generation of an HRK was described in method 600 with reference to FIG. 6, above, using components described in FIG. 3A.

In operation 600, a client computing device 100 generates an HRK for use in accessing a service 120 using an application 290.

In operation 805, a user of computing device 100 uses application 290 to access service 120 by presenting the HRK to the service 120.

In operation 810, service 120 challenges the presentation of the HRK to receive access to service 120.

In operation 700, client computing device 100 generates an HRKA that attests to the HRK, and sends the HRK and HRKA to a privacy CA 110 or 115. Privacy CA 110 or 115 verifies that the HRK was generated by the computing device 100 using the HRKA data and returns an X509 certificate to application 290 on computing device 100.

In operation 815, application 290 sends the signed X509 certificate to service 120 in response to the initial challenge by service 120 to the presentation of the HRK by the application to access service 120.

In operation 900, it can be determined whether service 120 accepts the HRK to grant access to service 120. Details of operation 900 are described below with reference to FIG. 9.

If, in operation 900, service 120 accepts the HRK, then in operation 820 service 120 can optionally request additional authentication information. A service 120 can have a policy as to whether, and under what circumstances, the service 120 will accept a verified HRK to allow access to service 120.

If, in operation 900, service 120 did not accept HRK, then operation 825 service 120 can require that a user provide authentication credentials, such as a login and passcode.

In operation 830, it can be determined whether the login was successful. If not, then in operation 835 service 120 can deny access to service 120.

If, in operation 830, the login was successful, then combined operations 600 and 700, service 120 can request and receive a new HRK and X509 certificate for that HRK to store in associate with the user authentication credentials for future access to service 120.

In operation 900, it can again be determined whether service 120 will accept the HRK and X509 certificate presented by the computing device 100 and application 290.

If, in operation 900, service 120 does not accept the HRK, then in operation 835 service 120 can deny access to service 120. Otherwise, in operation 845, service 120 can allow access to service 120.

Figure 9:
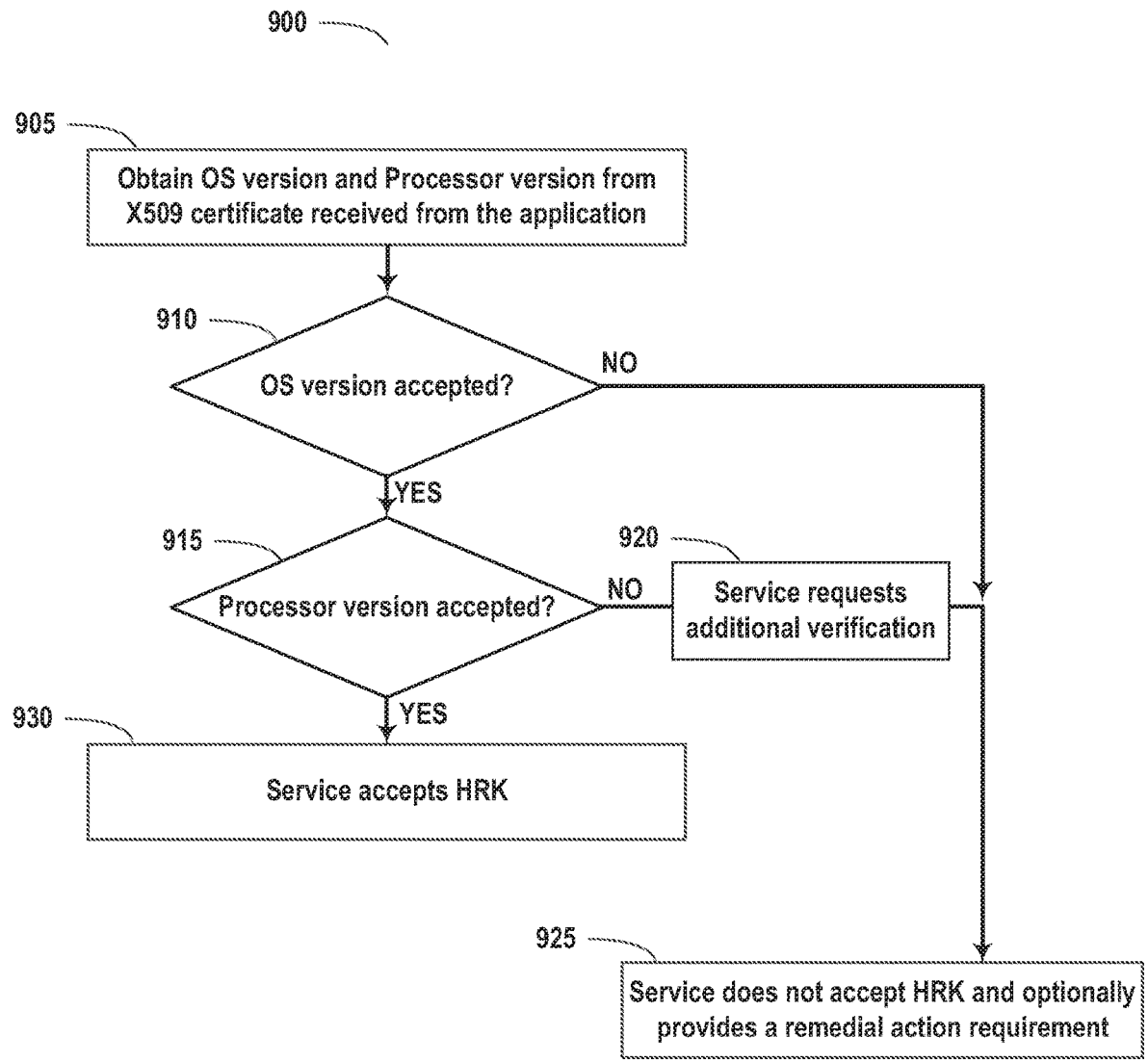
FIG. 9 illustrates a method of determining whether a service 120 will accept an HRK to allow access to service 120, according to some embodiments.

FIG. 9 illustrates a method 900 of determining whether a service 120 will accept an HRK to allow access to service 120, according to some embodiments.

In operation 905, service 120 can obtain the SEP OS version and processor type or class from the X509 certificate received from application 290 on computing device 100 application 290.

In operation 910, the service 120 can determine whether the service 120 will accept a hardware key that indicates that the computing device is using a particular version of SEP OS 240. For example, a version of SEP OS 240 may be known to have a been jail-broken. SEP OS 240 may not be the latest, or most secure, version of the SEP OS 240 such that service 120 does not trust an HRK based upon that version of SEP OS 240. Further, service 120 may have previously stored an indication of the version of SEP OS 240 that the device previously used, and may determine that the HRK is based on an older version of SEP OS 240, implying that the HRK may be a false HRK.

If, in operation 910, the SEP OS version 240 is not accepted, the method 900 continues at operation 925, otherwise the method 900 continues at operation 915.

In operation 915, it can be determined whether the service 120 will accept the processor type or class upon which the HRK is based. For example, a service may put greater trust in HRKs generated using a processor type that comprises an SOC 200 and an SEP 230 with a secure, isolated memory 255 than in a processing system 200 that is based on a general purpose CPU and uses memory that is accessible to kernel processes.

If, in operation 915, the processor type or class is not accepted, then method 900 continues at operation 920, otherwise the method 900 continues at operation 930.

In operation 920, service 120 can request additional verification by the user or of the processor type or of the SEP OS 240. The specific information required can be at the discretion of the service 120.

In operation 925, service 120 does not accept the HRK and can optionally provide a remedial action to the application 290. A remedial action can be an message or indication of action for the to take to once again be able to access service 120.

If, in operation 915, the processor type is accepted, the method 900 continues at operation 930, wherein the service 120 accepts the HRK.

Figure 10:
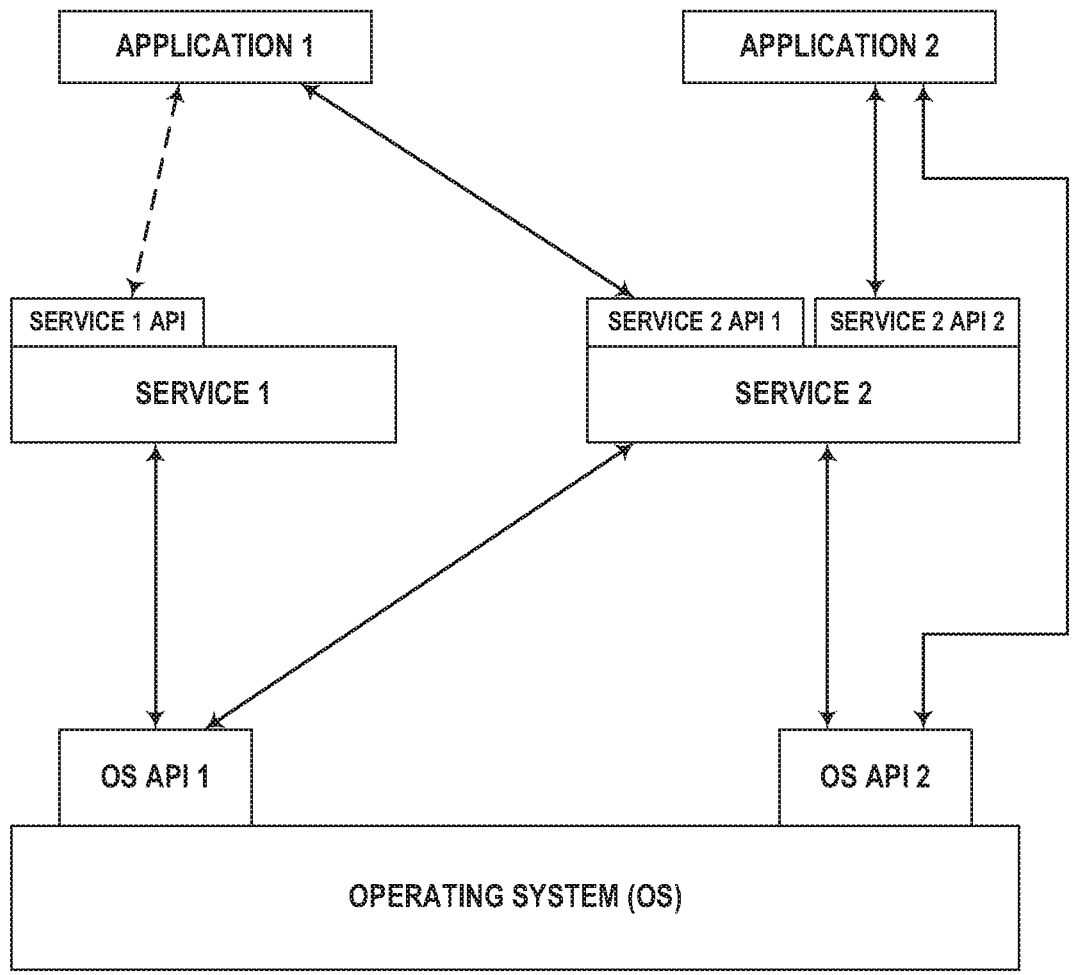
FIG. 10 illustrates an exemplary embodiment of a software stack usable in some embodiments of the invention.

In FIG. 10 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 11:
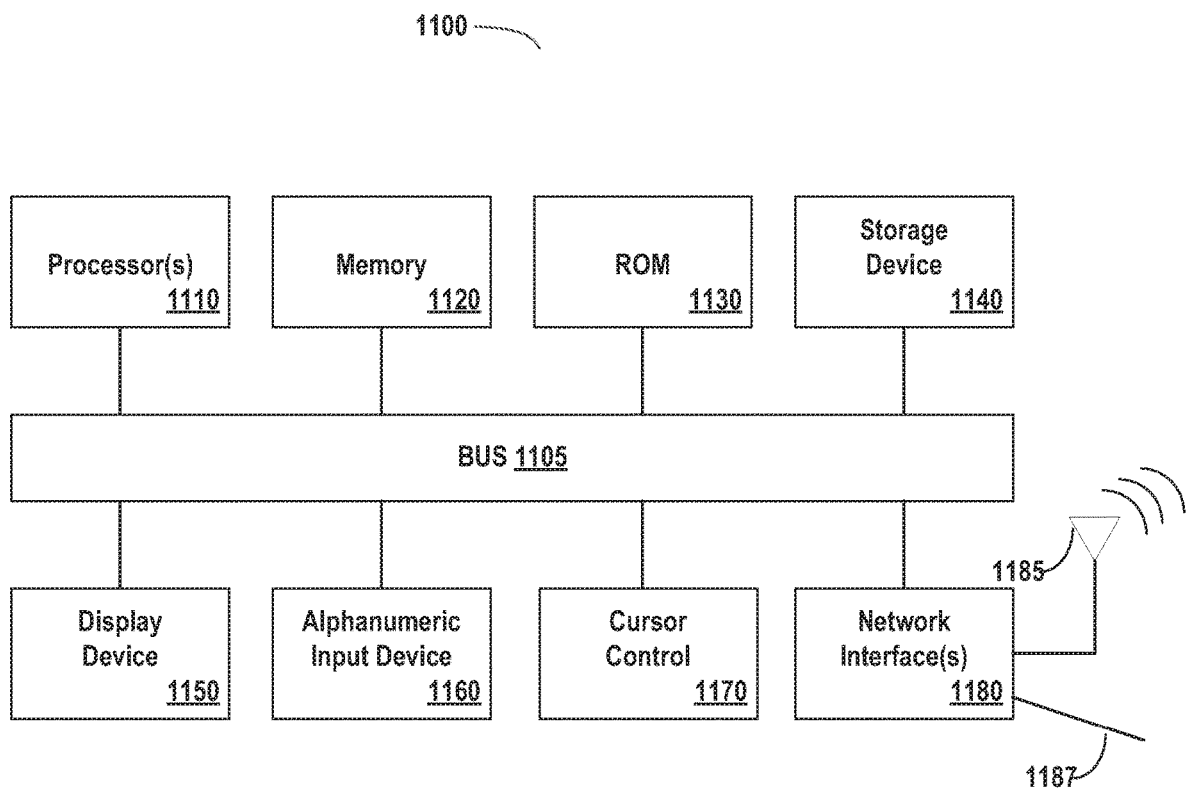
FIG. 11 is a block diagram of one embodiment of a computing system.

FIG. 11 is a block diagram of one embodiment of a computing system 1100. The computing system illustrated in FIG. 11 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 11 may be used to provide the computing device and/or the server device.

Computing system 1100 includes bus 1105 or other communication device to communicate information, and processor 1110 coupled to bus 1105 that may process information.

While computing system 1100 is illustrated with a single processor, computing system 1100 may include multiple processors and/or co-processors 1110. Computing system 1100 further may include random access memory (RAM) or other dynamic storage device 1120 (referred to as main memory), coupled to bus 1105 and may store information and instructions that may be executed by processor(s) 1110. Main memory 1120 may also be used to store temporary variables or other intermediate information during execution of instructions by processor 1110.

Computing system 1100 may also include read only memory (ROM) and/or other static storage device 1140 coupled to bus 1105 that may store static information and instructions for processor(s) 1110. Data storage device 1140 may be coupled to bus 1105 to store information and instructions. Data storage device 1140 such as flash memory or a magnetic disk or optical disc and corresponding drive may be coupled to computing system 1100.

Computing system 1100 may also be coupled via bus 1105 to display device 1150, such as a cathode ray tube (CRT) or liquid crystal display (LCD), to display information to a user. Computing system 1100 can also include an alphanumeric input device 1160, including alphanumeric and other keys, which may be coupled to bus 1105 to communicate information and command selections to processor(s) 1110. Another type of user input device is cursor control 1170, such as a touchpad, a mouse, a trackball, or cursor direction keys to communicate direction information and command selections to processor(s) 1110 and to control cursor movement on display 1150. Computing system 1100 may also receive user input from a remote device that is communicatively coupled to computing system 1100 via one or more network interfaces 1180.

Computing system 1100 further may include one or more network interface(s) 1180 to provide access to a network, such as a local area network. Network interface(s) 1180 may include, for example, a wireless network interface having antenna 1185, which may represent one or more antenna(e). Computing system 1100 can include multiple wireless network interfaces such as a combination of WiFi, Bluetooth® and cellular telephony interfaces. Network interface(s) 1180 may also include, for example, a wired network interface to communicate with remote devices via network cable 1187, which may be, for example, an Ethernet cable, a coaxial cable, a fiber optic cable, a serial cable, or a parallel cable.

In one embodiment, network interface(s) 1180 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1180 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Use Cases

The following use cases illustrate just a few applications and advantages of the inventive concepts described herein. The use cases are illustrative and not limiting.

Use case 1. Attest that a key is only available to PKA module 260 and is in use by the SEP OS 240 version that is currently running on the device. This is useful for a service 120 to be able to prove that an application 290 is currently running while a specific version of SEP OS 240 is running. An application developer may wish to confirm that a computing device 100 is running on the latest version of SEP OS 240 and lock out older versions. This would be useful in cases where the application developer does not want to have to go through the process of re-authenticating a user and is willing to rely on a manufacturer's policy that a user cannot "rollback" an SEP OS 240 version, so as to reasonably conclude that a key previously useable by a jail-broken SEP OS 240 is no longer available to that OS.

Example

A bank wants to use a hardware reference key (HRK) as a second or third factor to authenticate a user, but only if the computing device 100 is running the most current SEP OS 240 version. Hardware reference key (HRK) allows the bank servers to require a computing device 100 to attest to the HRK it is currently using via the Manufacturer's Privacy CA 110 or through third party attestation 115. The attestation certificate will include the current SEP OS 240 version and the bank servers can decide based on that SEP OS 240 version how to treat that computing device's 100 login attempt. This example usage would require access to the Manufacturer Privacy CA 110 or third party attestation 115 for each login attempt.

Use Case 2. Attest that a key is only available to PKA Module 260 and is in use by the SEP OS version that is currently running on the computing device 100 and only usable by that SEP OS 240 version. This would be useful to app developers that do not want to connect to the Manufacturer Privacy CA 110 or third party privacy CA 115 at each login and are willing to require users to attest to and certify a new HRK with each new SEP OS 240 version.

Example

A bank wants to use a hardware reference key (HRK) as a second or third factor to authenticate a computing device 100 but only if that hardware reference key was generated by the most recent SEP OS 240 version. The bank application would treat an SEP OS 240 update as if the user is using the application for the first time and authenticate with whatever factors are necessary. For any version of SEP OS 240 other than the most recent, the application could fall back to other factors for authentication, or refuse to allow the user to authenticate. This method would require access to the Manufacturer Privacy CA 110 or third party attestation service 115 each time the SEP OS 240 changes but provides a stronger guarantee that the HRK cannot be used by an older SEP OS 240 version. The result is a certificate chain that proves the version of SEP OS 240 specified by the OS version stored in the SEP 230 secure memory 255 is currently running and ONLY that version of SEP OS 240 has access to the login HRK.

Use case 3. Attest to an attestation key for use by third party. SEP OS 240 would generate a hardware reference key (HRK) with the ATTESTATION ONLY set. The SIK key would be used to certify that attestation hardware reference key with the Manufacturer Privacy CA 110. The Manufacturer Privacy CA 110 would issue a certificate that would allow the computing device 100 to attest to future keys with the third party attestation hardware reference key. Those attestations could be verified by the third party without contacting the Manufacturer Privacy CA 110.

Example

A bank may not wish to contact the Manufacturer Privacy CA 110 each time a new hardware reference key HRK is certified and may, instead, prefer to use their own privacy CA or a third party privacy CA of the bank's choice. The bank can set up a third party attestation service 115 accessible to the network 105 that accepts a certificate for an attestation hardware reference key (HRKA) certified by the Manufacturer Privacy CA 110 once on application 290 installation that is not tied to the SEP OS 240 version change. This will allow the bank to identify this computing device 100 across SEP OS 240 version updates until the computing device 100 is erase-installed or has erased all contents and settings. Once the bank attestation service is made aware of the public attestation key, certified by the Manufacturer Privacy CA 110, it can trust that any other keys attested to by the HRKA are only available for use by the PKA Module 260 on that same computing device 100. When the bank attestation service asks a computing device 100 to re-attest to an HRK using the HRKA, that attestation can be verified by the bank attestation service instead of the Manufacturer Privacy CA 110.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method, comprising:
   receiving, by a computing device, a request from an application to generate a hardware reference key (HRK) pair, wherein the HRK pair is usable with an attestation to attest to a presence of particular hardware in the computing device;
   generating, by the computing device, the HRK pair in response to the request, wherein the HRK pair includes a private key and a public key;
   using, by the computing device, a hardware identifier embedded in the computing device to generate the attestation for the HRK pair, wherein the hardware identifier is embedded at manufacture to identify a presence of the particular hardware in the computing device, wherein the attestation includes a digest signed using the private key and signed using the hardware identifier, and wherein the digest includes an indication of the particular hardware and the public key; and
   publishing, by the computing device, the public key of the HRK pair and the attestation.

2. The method of claim 1, wherein the HRK pair is generated based on a seed that includes a version of an operating system running on the computing device when the HRK pair is generated.

3. The method of claim 2, wherein the seed further includes identification information of the application that requested the HRK pair.

4. The method of claim 2, wherein the seed further includes a random seed portion, and wherein the signed digest identifies the seed.

5. The method of claim 1, wherein the particular hardware includes a type of processor in the computing device.

6. The method of claim 1, wherein the publishing is to a certificate authority operable to issue a corresponding certificate.

7. A non-transitory computer readable medium comprising instructions that, are executable by a computing device to cause the computing device to perform operations comprising:
  receiving from an application, a request to generate a hardware reference key (HRK) pair that is usable with an attestation to indicate a presence of particular hardware in the computing device;
  generating the HRK pair in response to the request wherein the HRK pair includes a private key and a public key;
  using a hardware identifier embedded in the computing device to generate the attestation for the HRK pair, wherein the hardware identifier is embedded at manufacture to identify a presence of the particular hardware in the computing device, wherein generating the attestation includes signing a digest that includes an indication of the particular hardware and the public key, wherein the digest is signed using the private key and using the hardware identifier; and
  publishing the public key of the HRK pair and the attestation.

8. The non-transitory computer readable medium of claim 7, wherein the HRK pair is generated based on a seed that includes a version of an operating system running on the computing device when the HRK pair is generated.

9. The non-transitory computer readable medium of claim 8, wherein the seed further includes identification information of the application that requested the HRK pair.

10. The non-transitory computer readable medium of claim 7, wherein the particular hardware includes a processor type included in the computing device.

11. The non-transitory computer readable medium of claim 7, wherein the publishing is to a certificate authority operable to issue a corresponding certificate.

12. The non-transitory computer readable medium of claim 7, wherein the operations further comprise: using the HRK pair to generate one or more additional hardware reference keys.

13. A computing device, comprising:
  a processing system having at least one hardware processor; and
  memory containing instructions by the processing system to cause the computing device to perform operations comprising:
  receiving from an application, a request to generate a hardware reference key (HRK) pair that includes a public key and a private key;
  generating the HRK pair in response to the request;
  using a hardware identifier embedded in the computing device to generate an attestation for the HRK pair, wherein the hardware identifier is embedded at manufacture to identify a presence of particular hardware in the computing device, wherein generating the attestation includes signing a digest that includes an indication of the particular hardware and the public key, wherein the digest is signed using the private key and using the hardware identifier; and
  publishing the public key of the HRK pair and the attestation.

14. The computing device of claim 13, wherein the HRK pair is generated based on a seed that includes a version of an operating system running on the computing device when the HRK pair is generated, and wherein the signed digest includes the seed.

15. The computing device of claim 14, wherein the seed further includes identification information of the application that requested the HRK pair.

16. The computing device of claim 14, wherein the seed further include a random seed portion.

17. The computing device of claim 13, wherein the particular hardware includes a type of the at least hardware processor.

18. The computing device of claim 13, wherein the public key of the HRK pair and the attestation are published to a certificate authority.

19. The computing device of claim 13, wherein the operations further comprise: using the HRK pair to certify another hardware reference key pair.

* * * * *